United States Patent

Nguyen et al.

[11] Patent Number: 6,001,268
[45] Date of Patent: Dec. 14, 1999

[54] REACTIVE ION ETCHING OF ALUMINA/TIC SUBSTRATES

[75] Inventors: Son Van Nguyen, Los Gatos; Diana Perez, San Jose; Andrew Chiuyan Ting, San Jose; Cherngye Hwang, San Jose, all of Calif.; Martin Straub, Niederolm; Gerd Dworschak, Zornheim, both of Germany

[73] Assignee: International Business Machines Corporation, Armonk, N.Y.

[21] Appl. No.: 08/869,931

[22] Filed: Jun. 5, 1997

[51] Int. Cl.⁶ .................................................. C03C 15/02
[52] U.S. Cl. ................................. 216/67; 216/74; 216/76; 216/77
[58] Field of Search ................................. 216/22, 67, 74, 216/76

[56] References Cited

U.S. PATENT DOCUMENTS

| | | |
|---|---|---|
| 4,933,318 | 6/1990 | Heijman . |
| 5,047,115 | 9/1991 | Charlet et al. . |
| 5,183,531 | 2/1993 | Terakado . |
| 5,217,567 | 6/1993 | Cote et al. . |
| 5,234,537 | 8/1993 | Nagano et al. . |
| 5,286,344 | 2/1994 | Blalock et al. . |
| 5,404,256 | 4/1995 | White . |
| 5,461,010 | 10/1995 | Chen et al. . |
| 5,476,182 | 12/1995 | Ishizuka et al. . |
| 5,622,596 | 4/1997 | Armacost et al. . |

FOREIGN PATENT DOCUMENTS

| | | |
|---|---|---|
| 4-4129217 | 4/1992 | Japan . |
| 5160078 | 6/1993 | Japan . |
| 7078804 | 3/1995 | Japan . |
| 8170181 | 7/1996 | Japan . |

OTHER PUBLICATIONS

"Process to Reactively Etch $Al_2O_3$ for Thin Film Head Fabrication", Disclosed anonymously 32065.
Y. H. Lee et al., "Chemical Sputtering of $Al_2O_3$ by Fluorine–Containing Plasmas Excited by Electron Cyclotron Resonance", IBM Research Division, Research Report 90A002982, 20 pgs., Mar. 30, 1990.

*Primary Examiner*—Bruce Breneman
*Assistant Examiner*—Allan Olsen
*Attorney, Agent, or Firm*—Merchant & Gould P.C.

[57] ABSTRACT

The invention is a method of patterning the air bearing surface of a ceramic slider preferably including alumina and titanium carbide. The method includes the steps of forming an etch pattern by depositing and developing a photoresist on the ceramic slider, and reactive ion etching the slider air bearing surface using an etchant gas of argon, sulfur hexafluoride, and methyltrifluoride flowing at a rate which provides a smooth patterned surface on the slider air bearing surface.

13 Claims, 2 Drawing Sheets

REACTIVE ION ETCHING OF ALUMINA/TIC SUBSTRATES

FIELD OF THE INVENTION

The invention relates generally to methods for etching ceramic materials. More specifically, the invention is a method for Reactive Ion Etching (RIE) ceramic substrates of binary, or greater, composition such as alumina/titanium carbide which provides greater etch rate with improved smoothness and definition.

BACKGROUND OF THE INVENTION

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

The recording density of a magnetic disk drive is limited by the distance between the transducer and the magnetic media. One goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

In addition to achieving a small average spacing between the disk and the transducer, it is also critical that a slider fly at a relatively constant height. The large variety of conditions the transducers experience during the normal operation of a disk drive can make constancy of fly height anything but a given. If the flying height is not constant, the data transfer between the transducer and the recording medium may be adversely affected.

The manner in which a slider is manufactured and the material the slider is fabricated from can affect fly height. It is also essential that variations in the physical characteristics of the slider, e.g. due to manufacturing tolerances, not substantially alter the flying height of the slider. If this result is not achieved, the slider's nominal fly height must be increased to compensate for variations between sliders.

In forming the slider, processes known to those skilled in the art are generally used. For example, the slider may be coated with a photoresist which is developed to allow for patterning of the slider. The slider may then be patterned by means such as ion beam etching or chemical plasma etching. For example, Japanese Patent No. 07-078804 discloses an ion beam etching process used to provide a thin film magnetic head. The mixing ratio of mixed gas is set so that an organic coating film and an inorganic insulating film are etched at the same rate. Japanese Patent No. 9145325 discloses a reactive ion etching process which comprises introducing $CHF_3$ and Ar gases at a flow ratio of 1:5 or more. The pressure inside the vacuum chamber is maintained at 0.3 Pa or lower to generate plasma for reactive ion etching (RIE).

Japanese Patent No. 08-170181 discloses a dry etching process for tungsten intended to enhance the uniformity of etching rate in the surface of a wafer by using a gaseous mixture of sulfur hexafluoride with Ar when tungsten is dry-etched. Japanese Patent No. 4-129217 discloses a sputter etching process using argon gas that enables cleaning while redeposits in a through hole are removed.

All of Chen, et al, U.S. Pat. No. 5,461,010, Terkado, U.S. Pat. No. 5,183,531, Nagano, et al, U.S. Pat. No. 5,234,537, and Blalock, U.S. Pat. No. 5,286,344 also disclose etching processes which may be used for various substrates. For example, Charlet et al, U.S. Pat. No. 5,047,115 discloses a process for etching a substrate with the aid of a gas plasma produced either by ultra-high frequency waves, or by ultra-high frequency and radio-frequency waves. However, Charlet et al does not contemplate the etching of ceramics or obtaining enhanced smoothness through the use of tertiary etchant gas mixtures, applied to composited ceramics.

These publications reflect a broad base of teaching concerning the use of etching in the formation of various substrates. However, these etchings do not contemplate the problems of smoothness, rate, and definition among other concerns of ceramics of binary (or greater) composition.

As a result, there is a need for methods which will provide reactive ion etching of ceramic substrates with reliable smoothness, rate and definition.

SUMMARY OF THE INVENTION

In accordance with a first aspect of the invention, there is provided a method for etching a ceramic material comprising alumina and titanium carbide. The method comprises the step of reactive ion etching the ceramic material using an etchant gas of argon, methyl trifluoride, and sulfur hexafluoride. The etchant gas is flowed at a rate which provides a smooth surface on the ceramic material.

In accordance with a more preferred aspect of the claimed invention, there is provided a method of patterning the air bearing surface of a ceramic slider comprising alumina and titanium carbide. The method comprises the steps of forming an etch pattern by depositing and developing a photoresist on the ceramic slider and reactive ion etching said air bearing slider surface using an etchant comprising argon, sulfur hexafluoride, and methyltrifluoride. The etchant gas flows at a rate which provides a patterned surface on the slider air bearing surface. Generally, the etchant gas comprises argon flowing at a rate of about 25 to 45 sccm, methyl trifluoride flowing at a rate of about 6 to 18 sccm, and sulfur hexafluoride flowing at a rate of about 3 to 19 sccm.

In accordance with a further aspect of the claimed invention, there is provided a ceramic substrate resulting from the method of the invention. The ceramic substrate has a smoothness ranging from about 20 to 300 Å when measured by atomic force microscopy. The ceramic substrate may be etched smooth or etched to form a pattern such as is common with the air bearing surface of the slider in a hard drive assembly.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

One aspect of the invention is a method of patterning the air bearing surface of a ceramic slider. An exemplary ceramic slider comprises alumina and titanium carbide. Generally the method comprises the steps of forming an etch pattern by depositing and developing a photoresist on the ceramic slider. Reactive ion etching may then be used to pattern the air bearing slider surface using an etchant gas of argon, sulfur hexafluoride, and methyltrifluoride.

Generally the method of the invention may be used to etch any alumina/titanium carbide substrate. One exemplary substrate is a slider used in the hard drive assembly in computing systems common in the industry.

Figure 1:
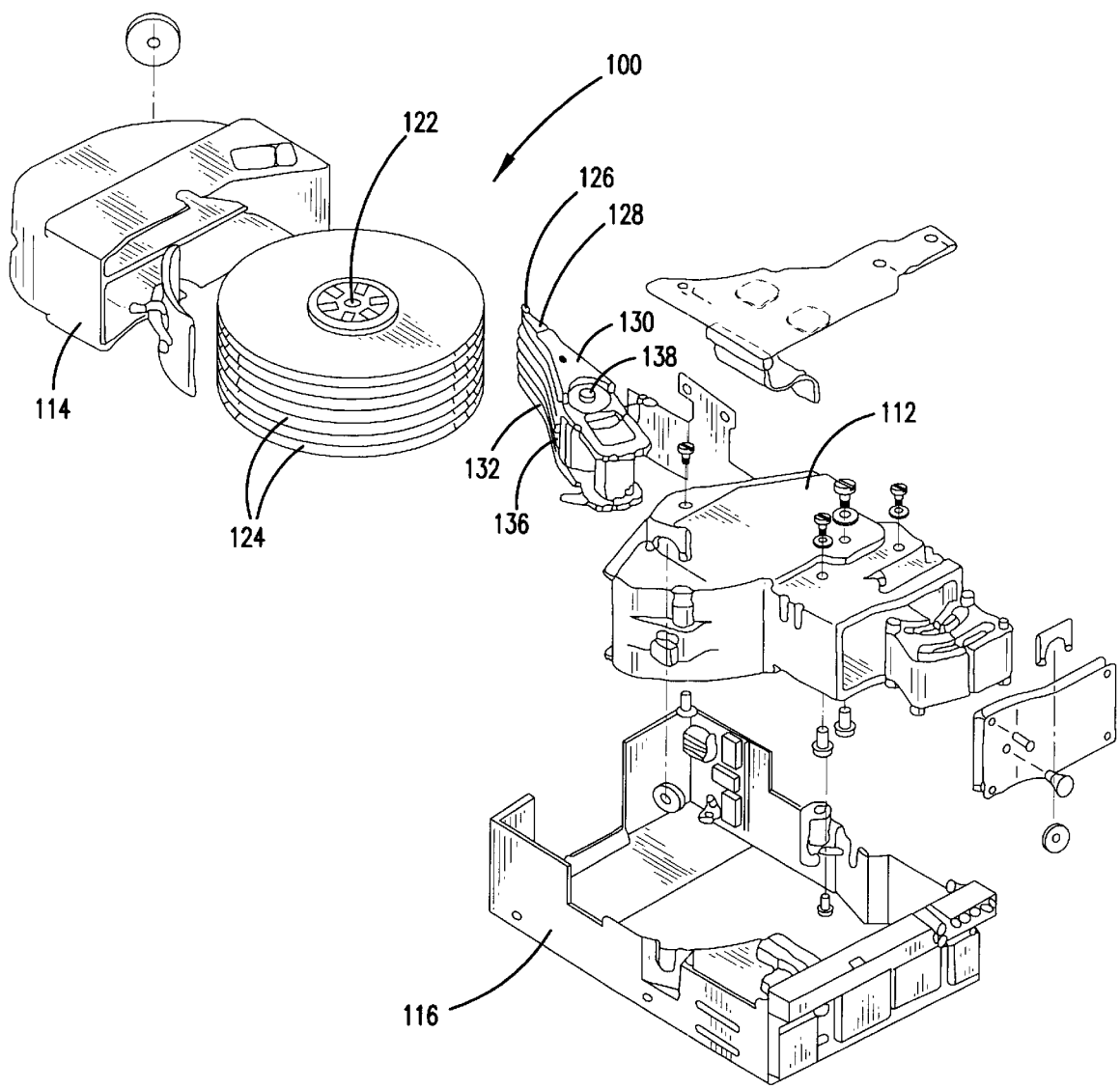
FIG. 1 is an exploded perspective view of an exemplary hard drive assembly including a slider.

An exemplary hard drive assembly may be seen in FIG. 1 which is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122 which is powered by a motor (not shown).

Information is written on or read from the disks 124 by heads or magnetic transducers (not shown) which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138.

In a typical magnetic recording system, data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

Figure 2A:
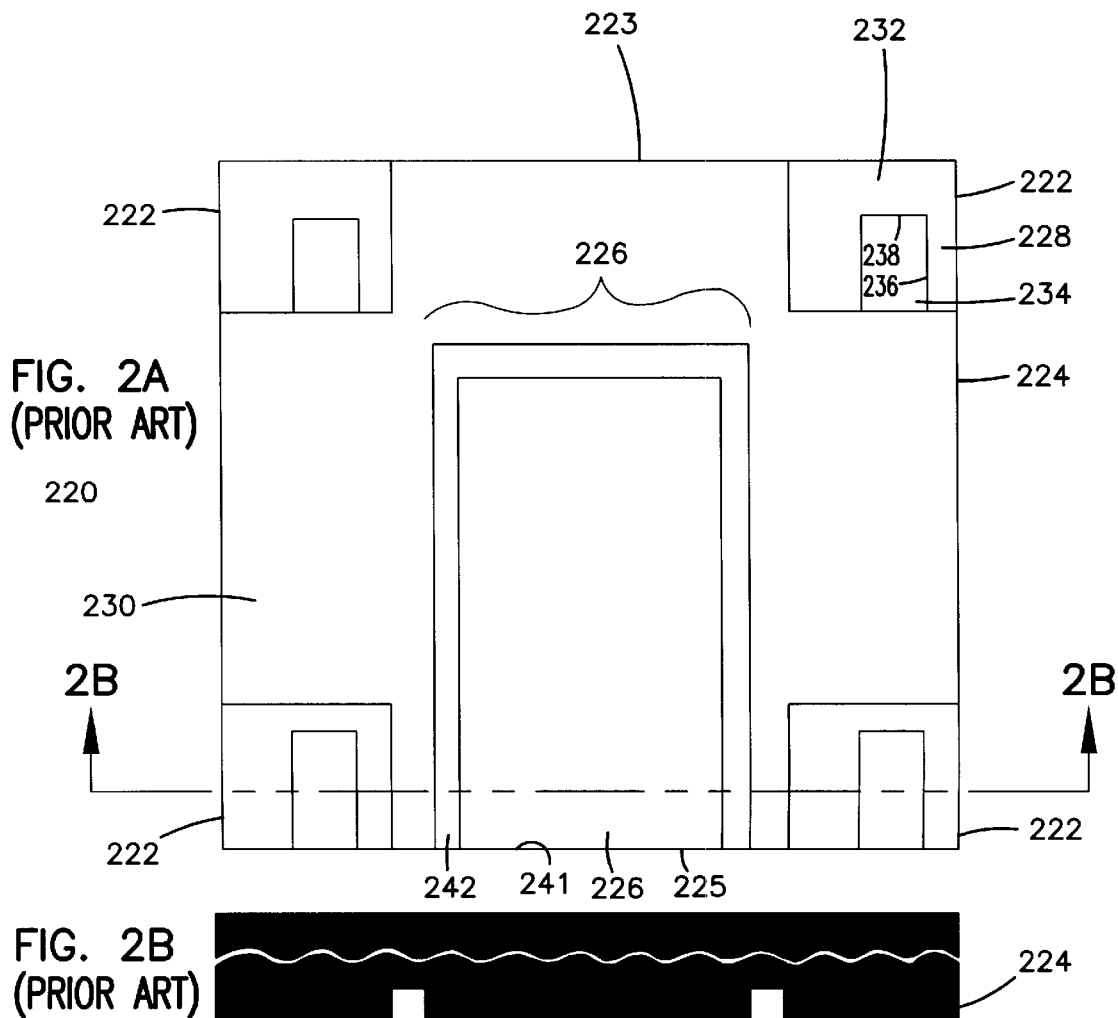
FIG. 2A is a bottom plan view of an exemplary slider.
Figure 2B:
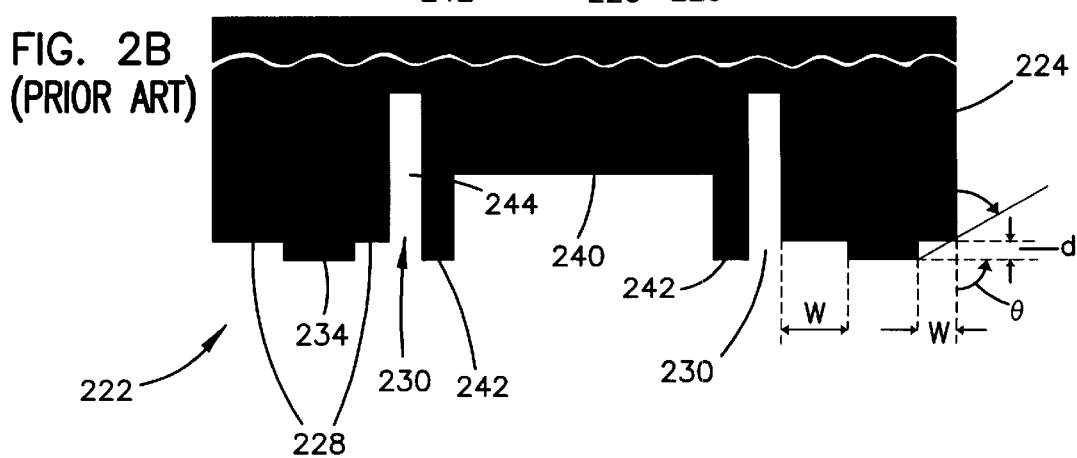
FIG. 2B is a partial cutaway view along axis B—B of the slider depicted in FIG. 2A.

To facilitate the read/write operations of the hard drive assembly, slider design can be intricate, to ensure correct and constant fly height in varying conditions. To fulfill the intended purpose of the slider, it is often patterned with various reliefs and protrusions to enhance aerodynamic character. For example, FIGS. 2A–2B illustrate a slider design 200 as disclosed in U.S. Pat. No. 5,404,256, issued Apr. 4, 1995 to James W. White, entitled "TRANSVERSE AND NEGATIVE PRESSURE CONTOUR GAS BEARING SLIDER", and which is incorporated by reference herein. The slider illustrated in FIGS. 2A–2B is designed to provide uniform and controllable fly height through a range of skew angles.

In FIGS. 2A–2B, traverse pressure contour (TPC) pads 222 are defined by a face 234 for creating a gas bearing effect, a generally U-shaped TPC section 228 including a constant depth step bearing along each side edge 236 of the face 234 and a constant depth step along the leading edge 238 forming a converging compression inlet 232. Thus, the gas bearing contour of the TPC pad 222 is defined by two parallel planes created by two different etch steps.

A negative pressure pad 226 is defined by a substantially planar surface which contains a recess 240 open at the trailing end 225. The negative pressure pad 226 may further include one or more bearing faces 242 at a height approximately that of the faces 234 of the TPC pads 222 for creating a gas bearing effect. Recess 240 is open along the trailing edge 241; that is, trailing edge 241 is substantially ambient. The ambient pressure reservoir 230 defines a cavity 244 having a depth and configuration sufficient to maintain substantial ambient pressure in the cavity during movement of the disk. Further, ambient pressure reservoir 230 includes a non-tapered (non-stepped, non-convex) inlet along leading edge 223 so as to inhibit generation of gas bearing effects created by compression of inlet gas.

The design as illustrated in FIGS. 2A–2B requires three etch depths to achieve the desired performance. As a result, given the nature of the material, there is a real need for an etching process which can define the intricate detail on the slider face to enhance the aerodynamic character of this hard drive assembly element.

Processing

In accordance with the invention, the ceramic substrate may be masked by means known to those of skill in the art such as commercially available photolithography systems. Reactive ion etching is then used to etch a substrate comprising alumina and titanium carbide. Generally the substrates which may be etched with the method of the invention comprises from about 60 wt-% to 70 wt-% alumina and 30 wt-% to 40 wt-% titanium carbide. The ceramic substrate may also comprise as much as about 5 wt-% $ZrO_2$ given the application of the substrate.

We have found that by using a tertiary gas mixture, a more regular and even etching of the $Al_2O_3/TiC$ substrate may be achieved. This gas mixture not only provides for greater smoothness but also provides for greater versatility in definition at an etch rate which is commercially practical. These gases generally include gases which are reactive or coreactive with the substrate material as well as inert carrier gases. Preferred gases include argon, sulfur hexafluoride, and methyltrifluoride.

While the inventors do not wish to be bound by a theory of activity, the etching reaction is believed to proceed according to the following mechanisms.

$$SF_6 + e^- \rightarrow SF_x + yF \qquad (I)$$

Fluorine is believed to be the dominant etchant for titanium carbide wherein x and y are an integer which total no more than 6.

$$CHF_3 + e^- \rightarrow HF + CF_2 \qquad (II)$$

Carbon difluoride, produced through multiple steps, is believed to be the dominant etchant for alumina ($Al_2O_3$).

$$Ar + e^- \rightarrow Ar^* + e^- \qquad (III)$$

This is a Penning reaction which is believed to create a stable Argon radical (Ar*), with a long half life, which enhances methyltrifluoride and sulfurhexafluoride dissociative reactions.

$$Ar + e^- \rightarrow Ar^+ + e^- \qquad \text{(IV)}$$

The Argon cation ($Ar^+$) enhances ion bombardment and, in turn, creates greater physical sputtering for alumina, titanium carbide, and zirconia, when present.

Other parameters which are also relevant to the reactive ion etching process include power, pressure, bias voltage, and temperature. Generally, the amount of power (measured in kilowatts), used in reactive ion etching affects etch rate, finished substrate smoothness, and finished substrate uniformity. Increasing power, generally increases etch rate, smoothness and uniformity. Increase power, also lowers tolerance for the formation of detail on the substrate. Decreasing power provides the complementary affect of generally decreasing etch rate, smoothness and uniformity.

Pressure also affects etch rate, smoothness, and uniformity. By increasing pressure all of etch rate, smoothness, and uniformity generally decrease. In turn, decreasing pressure increases etch rate, smoothness and uniformity.

Bias voltage and temperature also affect processing. Increasing bias voltage, which is an increase in ion bombardment, increases the etch rate and generally improves the smoothness of the etched surface. Increasing and/or decreasing temperature is not as important as maintaining control of temperature. Temperature control is critical for maintaining etch uniformity given the exothermic nature of the etching reaction.

One exemplary system used to carry out the reactive ion etching is a low density plasma system in the configuration of an RF Parallel Plate Capacitively Coupled Batch configuration typically known to those of skill in the art. The RF power density is in the range of 1.32 W/(cm)$^2$ to 2.27 W/(cm)$^2$ and the RF frequency is 13.56 MHz. A High Density Plasma System with the dual frequencies in 0.4 to 200 MHz range power and biasing also works in this etching chemistry.

The unprocessed, unetched alumina/titanium carbide row-bars to be etched may be bonded on a stainless steel carrier which is painted on the back side with a thermally conductive silver-silicone paste as well as the copper electrode which is nickel plated. The carrier may be placed on the electrode (cathode). The can, (anode), and cathode are water cooled to an average of 15° degrees Celsius. The etching reactions are highly exothermic. Thus, improved heat transfer and temperature control are important for etch uniformity and reproducibility. The row-bars are masked with a photoresist to define the areas to be etched. The photoresist to substrate etch ratio is approximately 5 to 1.

The system is closed and adjusted to the operating pressure and temperature. The mixed inert and reactive gases may be emitted through a device such as a shower head installed on the top plate. The system may then be ramped up to the operating power and the plasma is ignited. Every exposed surface to the plasma is being worked upon through a combination of physical sputtering and the chemical activity of the reactive species.

The power and gases may be shut off at the predetermined time. The system may then be adjusted to ambient atmospheric pressure. The carriers with row-bars are removed, stripped, and cleaned. The cleaned carriers with row-bars are then measured for smoothness.

Generally, the method of the invention may be used to provide a smoothness of about 20 to 300 Å. Preferably, the method of the invention provides a smoothness of less than about 250 Å and more preferably less than about 100 Å for an etch depth of about 0.5 μm or less.

The Tables provided below provide exemplary processing guidelines for the method of the invention.

|  | USEFUL | PREFERRED | MORE PREFERRED |
|---|---|---|---|
| Gases | | | |
| GAS FLOWRATE (SCCM) | | | |
| Argon | 25–70 | 25–45 | 33–37 |
| Methyl TriFluoride | 1–18 | 6–18 | 12–18 |
| Sulfur Hexafluoride | 3–18 | 3–9 | 5–7 |
| Reaction Parameters | | | |
| PARAMETER | | | |
| Temperature (° C.) | 40–100 | 50–80 | 40–60 |
| Power (kw) | 3500–6000 | 3800–4200 | 4000–4200 |
| Bias Voltage (V) | 1600–2200 | 1800–2200 | 1900–2000 |
| Frequency (MH$_z$) | 0.4–200 | 1–20 | 13.56 |
| Etch Rate (Å/min.) | 80–650 | 370–490 | 425–475 |
| Pressure (MTorr) | 1.5–6.0 | 3–4 | ~3.5 |

EXAMPLES

The following working and comparative examples provide a typical nonlimiting illustration of some of the advantages of the invention.

A series of studies were undertaken to determine the relative smoothness which could be obtained when etching deep and shallow etches. The results of each etch are reported in the Tables below in terms of atomic force microscopy (AFM) measured in Å and light diffraction at the substrate surface (Zygo) measured in Å for average roughness (Ra), and microns (μm) for average etch depth. Process conditions are reported in flow rate (sccm), plasma voltage (kw), and pressure (mT).

TABLE 1

(5 μm - deep etch)

| Example | Process Conditions | Depth Target (μm) | Zygo Etch Depth (μm) | Zygo Ra (Å) | AFM Etch Depth (μm) | AFM Ra (Å) |
|---|---|---|---|---|---|---|
| Comparative Example 1A | He/SF6/CHF3 = 35/6/18 sccm, 4.2 Kw, 3.5 mT | 5 μm | 5.8 μm, s = 2.5% | 293Å, s = 16.6% | >4.7 μm | 575 +/− 15Å |
| Working Example 1 | Ar/SF6/CHF3 = 35/6/18 sccm, 4.2 Kw, 3.5 mT | 5 μm | 4.7 μm, s = 1.5% | 550Å, s = 12% | >4.7 μm | 570 +/− 20Å |
| Comparative Example 1B | Xe/SF6/CHF3 = 25/4/12 sccm, 4.2 Kw, 3.5 mT | 5 μm | 3.9 μm, s = 2% | 828Å, s = 9.1% | >4.7 μm | 630 +/− 10Å |

TABLE 2

(0.5 μm - shallow etch)

| Example | Process Conditions | Depth Target (μm) | Zygo Etch Depth (μm) | Zygo Ra (Å) | AFM Etch Depth (μm) | AFM Ra (Å) |
|---|---|---|---|---|---|---|
| Comparative Example 2A | He/SF6/CHF3 = 35/6/18 sccm, 4.2 Kw, 3.5 mT | 0.5 μm | 0.58 μm, s = 3.4% | 48Å, s = 8.3% | >0.576 μm, s = 3.4% | 300 +/− 50Å |
| Working Example 2 | Ar/SF6/CHF3 = 35/6/18 sccm, 4.2 Kw, 3.5 mT | 0.5 μm | 0.46 μm, s = 3% | 35Å, s = 1.3% | 0.525 μm, s = 1.3% | 250 +/− 40Å |
| Comparative Example 2B | Xe/SF6/CHF3 = 25/4/12 sccm, 4.2 Kw, 3.5 mT | 0.5 μm | 0.307 μm, s = 12.4% | 62Å, s = 24% | 0.44 μm, s = 5.1% | 295 +− 95Å |

From this work, it can be seen that Working Examples 1 and 2 provide higher smoothness in comparison to the associated Comparative Examples. These results show that the addition of suitable inert gas such as argon significantly improved the etch surface smoothness (Ra) and etch depth uniformity as compared to other inert gases such as helium or xenon under the same conditions. For both shallow (0.5 μm or less) and deep etch (5 μm), these improvements are holding true as shown. The most improvement is generally observed in the etch depth range of equal to or less than 1 micron.

The above specification, examples and data provide a complete description of the manufacture and use of the methods and composition of the invention. Since many embodiments of the invention can be made without departing from the spirit and scope of the invention, the invention resides in the claims hereinafter appended.

What is claimed is:

1. A method for etching a ceramic material, said ceramic material comprising alumina and titanium carbide, said method comprising the step of reactive ion etching said ceramic material using an etchant gas comprising argon, methyl trifluoride, and sulfur hexafluoride, said etchant gas flowing at a rate which provides a smooth surface on said ceramic material wherein said smooth surface on said ceramic material has a smoothness ranging from about 20 to 300 Å when measured by atomic force microscopy.

2. The method of claim 1, wherein said smooth surface on said ceramic material has a smoothness of at least about 250 Å when measured by atomic force microscopy.

3. The method of claim 1, wherein said reactive ion etching is conducted at a temperature ranging from about 40° C. to 100° C.

4. The method of claim 1, wherein said reactive ion etching is conducted at a bias voltage ranging from about 1600 Kv to 2200 Kv.

5. The method of claim 1, wherein said reactive ion etching is conducted at a rate ranging from about 80 to 650 Å/min.

6. The method of claim 1, wherein argon flows at a rate of about 25 to 45 sccm; methyltrifluoride flows at a rate of about 6 to 18 sccm; and sulfur hexafluoride flows at a rate of about 3 to 9 sccm.

7. The method of claim 1, wherein argon flows at a rate of about 33 to 37 sccm; methyltrifluoride flows at a rate of about 12 to 18 sccm; and sulfur hexafluoride flows at a rate of about 5 to 7 sccm.

8. A method of patterning the air bearing surface of a ceramic slider, said ceramic slider comprising alumina and titanium carbide, said method comprising the steps of:
   (a) forming an etch pattern by depositing and developing a photoresist on said ceramic slider;
   (b) reactive ion etching said air bearing slider surface to form a first smooth etched surface using an etchant gas, said etchant gas comprising argon, sulfur hexafluoride, and methyltrifluoride, said etchant gas flowing at a rate which provides a patterned surface on said slider air bearing surface wherein said smooth surface on said ceramic material has a smoothness ranging from about 20 to 300 Å when measured by atomic force microscopy.

9. The method of claim 8, wherein said first etched surface has a smoothness of at least about 250 Å when measured by atomic force microscopy.

10. The method of claim 8, wherein said reactive ion etching is conducted at a temperature ranging from about 50° C. to 80° C.

11. The method of claim 8, wherein said reactive ion etching is conducted at a bias voltage ranging from about 1000 Kv to 2500 Kv.

12. The method of claim 8, wherein said reactive ion etching is conducted at a rate ranging from about 370 to 490 Å/min.

13. The method of claim 8, wherein argon flows at a rate of about 33 to 37 sccm; methyltrifluoride flows at a rate of about 12 to 18 sccm; and sulfur hexafluoride flows at a rate of about 5 to 7 sccm.

* * * * *